(12) United States Patent
Nepomuceno

(10) Patent No.: US 10,475,350 B1
(45) Date of Patent: Nov. 12, 2019

(54) SYSTEM AND METHOD FOR A DRIVING SIMULATOR ON A MOBILE DEVICE

(71) Applicant: STATE FARM MUTUAL AUTOMOBILE INSURANCE COMPANY, Bloomington, IL (US)

(72) Inventor: John A. Nepomuceno, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 582 days.

(21) Appl. No.: 15/095,815

(22) Filed: Apr. 11, 2016

(51) Int. Cl.
*G09B 9/05* (2006.01)
*G06Q 40/08* (2012.01)
*G09B 5/02* (2006.01)

(52) U.S. Cl.
CPC ............. *G09B 9/05* (2013.01); *G06Q 40/08* (2013.01); *G09B 5/02* (2013.01)

(58) Field of Classification Search
CPC ............ G09B 9/05; G09B 5/02; G06Q 40/08
USPC ......................................................... 434/69
See application file for complete search history.

(56) References Cited

U.S. PATENT DOCUMENTS

| | | | |
|---|---|---|---|
| 5,474,453 A | 12/1995 | Copperman | |
| 2006/0040239 A1* | 2/2006 | Cummins | G09B 9/05 434/62 |
| 2008/0082372 A1 | 4/2008 | Burch | |
| 2008/0254417 A1* | 10/2008 | Mohamed | G09B 9/04 434/69 |
| 2012/0135382 A1* | 5/2012 | Winston | G09B 9/04 434/65 |
| 2013/0045804 A1 | 2/2013 | Ruke | |
| 2013/0337417 A1* | 12/2013 | Nepomuceno | G09B 9/052 434/62 |
| 2014/0220513 A1* | 8/2014 | Harkness | G09B 9/05 434/69 |
| 2015/0104757 A1 | 4/2015 | Moncrief et al. | |
| 2015/0310758 A1* | 10/2015 | Daddona | G09B 9/02 434/62 |

OTHER PUBLICATIONS

Non-Final Office Action for U.S. Appl. No. 14/715,918 dated Aug. 17, 2015.
Final Office Action for U.S. Appl. No. 14/715,918 dated Dec. 3, 2015.
Simone et al., Head-Mounted Displays for Clinical Virtual Reality Applications: Pitfalls in Understanding User Behavior While Using Technology, CyberPsychology & Behavior, vol. 9, No. 5, 2006, pp. 591-602.

(Continued)

*Primary Examiner* — Robert P Bullington
(74) *Attorney, Agent, or Firm* — Marshall, Gerstein & Borun LLP; Randall G. Rueth

(57) ABSTRACT

A system and method facilitates a driving simulator on a mobile device. A driver may input data related to the desired simulation. A simulation may be determined based on the received data. The simulation may include a particular vehicle, road, driving condition, etc. The determined simulation may then be transmitted to a client devices. The client device may then render the simulation and collect driving data during the simulation. The collected driving data may be received and analyzed to determine a driving competency score.

15 Claims, 3 Drawing Sheets

(56) References Cited

OTHER PUBLICATIONS

Advisory Action for U.S. Appl. No. 14/715,918 dated Mar. 22, 2016.
Non-Final Office Action for U.S. Appl. No. 14/715,918 dated May 9, 2016.
Diete, http://scholarworks.umass.edu/theses, "Evaluation of a Simulator Based, Novice Driver Risk Awareness Training Program", 2008.
Final Office Action for U.S. Appl. No. 14/715,918 dated Sep. 22, 2016.
Non-Final Office Action for U.S. Appl. No. 14/715,918 dated Jan. 27, 2017.
Final Office Action for U.S. Appl. No. 14/715,918 dated Aug. 7, 2017.
Non-Final Office Action for U.S. Appl. No. 14/715,918 dated Nov. 21, 2017.
Firemonkeys Studios, Real Racing 3 Game, 2013.

* cited by examiner

SYSTEM AND METHOD FOR A DRIVING SIMULATOR ON A MOBILE DEVICE

FIELD OF THE DISCLOSURE

The following disclosure relates to a system and method for providing a driving simulator on a mobile device to be used in assessing a user's real-life driving abilities.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The cost of driver's education programs continues to limit the appeal of traditional driver's education for many new drivers. To reduce driver's education costs, new drivers can take an on-road driving test before taking any lessons (public or private). Afterward taking the on-road driving test, the driving examiner would describe all of the skills and procedures that the new driver needs to improve before the driver could pass the on-road driving test. Thus, the new driver would then only practice those particular skills and procedures identified by the examiner, and then take the test again.

For many new drivers, the above strategy could potentially save hundreds of dollars in private driving school lessons. However, this strategy would also limit the knowledge, skills, abilities and experience of newly-licensed drivers (because they would miss the comprehensive tutelage of traditional driving schools). By focusing only on the skills identified by the driving examiner, a new driver may lack the higher order skills (hazard anticipation, situational awareness, distraction mitigation, etc.) needed for longer-term driving safety. For driver licensing offices, this strategy has resulted in extended service times at licensing offices, and increased stress and crash risk for the driving examiners. For the public at large, the net effect would be a lower quality of newly-licensed drivers on the road.

Driving simulator technology can be implemented as a solution to mitigate driving school costs while also improving driving skills for new drivers. However, although driving simulators for training and assessment have been around for some time, most of these driving simulators have been adapted from costly driving simulation research applications. The cost of these driving simulators remains prohibitive for most licensing offices and driving schools, with the best current driving simulator costing over $75,000. Furthermore, no driving simulation technology currently exists that can be run on a mobile device to provide a driving assessment.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one embodiment a method for providing a driving simulation to assess driving competency includes receiving, via a computer network, one or more parameter inputs corresponding to features to be rendered during the driving simulation. The method may further include determining, by one or more processors, an appropriate driving simulation based on the received input parameters and other parameters. The method may further include transmitting, via the computer network, the determined driving simulation for execution on a client device. Still further, the method may include receiving, via the computer network, driving simulation data recorded during the execution of the determined simulation, wherein the driving simulation data comprises head movements, eye movements, arm movements, body movements, reaction to elements of the driving simulation, or controls operated during the simulation. The method may also include analyzing, by one or more processors, the recorded driving simulation data to determine a driving competency score, wherein the driving competency score is a measure of driving performance during execution of the determined simulation.

According to another embodiment, a computer-implemented method for rendering a driving simulation includes receiving, via one or more client devices, one or more parameter inputs corresponding to features to be rendered during the driving simulation. The method may further include transmitting, via a computer network, the received parameter inputs. Still further the method may include receiving, via the computer network, a particular driving simulation based on the one or more parameter inputs. The method may also include executing, via a client device, the particular driving simulation. Still further, the method may include recording, via the one or more client devices, driving simulation data corresponding to the execution of the particular driving simulation, wherein the driving simulation data comprises head movements, eye movements, arm movements, body movements, reaction to elements of the driving simulation, or controls operated during the simulation. The method may also include transmitting, by one or more processors, the recorded driving simulation data.

In yet another embodiment, a system includes one or more processors, a client device including a camera, an accelerometer, and a touchscreen display and a non-transitory computer-readable medium. The system storing thereon instructions that, when executed by the one or more processors, cause the system to receive one or more parameter inputs corresponding to features to be rendered during a driving simulation. The instructions further causing the system to transmit the received parameter inputs. The instructions further causing the system to receive a particular driving simulation based on the one or more parameter inputs. The instructions further causing the system to execute, via the components of the system, the particular driving simulation. The instructions may also cause the system to record, via the components of the system, driving simulation data corresponding to the execution of the particular driving simulation, wherein the driving simulation data comprises head movements, eye movements, arm movements, body movements, reaction to elements of the driving simulation, or controls operated during the simulation. Still further, the instructions may cause the system to transmit the recorded driving simulation data.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
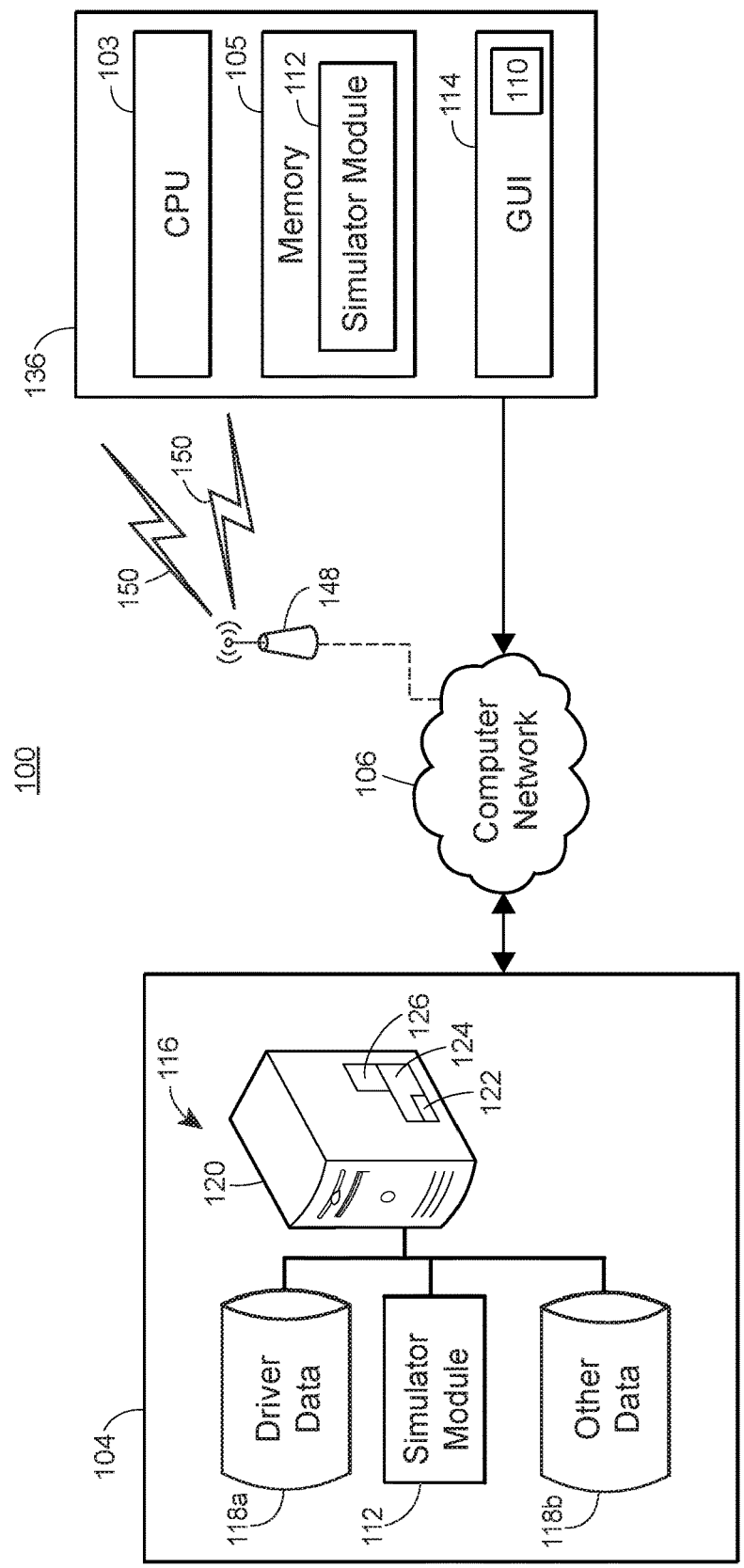
FIG. 1 is a simplified and exemplary block diagram of a system for a driving simulator on a mobile device.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The systems and methods discussed herein address a challenge that is particular to improving driver training. In particular, the challenge relates to a difficulty in effectively, efficiently providing an interactive driving simulator on a mobile device. In conventional situations, a driving simulator is implemented in a large stand-alone machine that is particularly configured to provide a driving simulation. In contrast, the systems and methods of the current application utilize network connections, and the controls and other components of a mobile device to perform a driving simulation, collect data to assess driving ability, and identify deficiencies in a driver's abilities. Therefore, because the systems and methods employ the collection, compiling, analyzing, and communicating of data to perform these functionalities, the systems and methods are necessarily rooted in computer technology in order to overcome the noted shortcomings that specifically arise in the realm of improving driving simulation.

According to implementations, the systems and methods may support a dynamic, real-time or near-real-time collection, analysis, and communication of any data that may be associated with the assessments. In particular, the systems and methods may dynamically and automatically collect simulation data from the mobile device in real-time or near-real-time, may automatically and dynamically analyze the collected data, may automatically and dynamically assess driver ability. In this regard, any individuals interested in driving simulation based driver training may implement a mobile device to perform such actions.

Further, it should be appreciated that the systems and methods may include specialized (i.e., non-generic) or dedicated components capable of performing specialized (i.e., non-generic) or dedicated computer functions. In particular, the systems and methods employ various device sensors that are specifically configured to collect certain data. Further, electronic devices interface with the specialized sensors to collect the data and analyze the data.

Driving simulators could be used as a safe solution to vastly improve current driver's education methods. The techniques of the present disclosure aim to leverage recent technological advancements to provide an inexpensive, realistic, and widely available driving simulator. Specifically, current mobile device technology is capable of executing the driving simulator of the present application. A mobile device in combination with an internet connection can be implemented to create a low cost driving simulation system.

For new and/or experienced drivers, a driving simulator could serve as a safe way to practice various driving skills and to assess driving competency. The driving simulator can be used to recreate a plurality of simulations including various vehicles, roads and weather conditions. The plurality of simulations can be implemented to assess, teach, and practice specific driving skills. The driving simulator can present the novice or inexperienced driver with hazardous or dangerous driving situations in a driving experience that would be safer than real-world driving. By practicing skills using a driving simulator, drivers will be better prepared for driving in the real world. Also, as vehicle automation becomes more prevalent, it may be important for drivers to have the ability to exercise driving skills using a realistic simulation to avoid skill degradation due to lack of practice.

Further, licensing agencies and/or insurance companies can benefit by having driving competency assessments performed by the driving simulator. The driving simulator can analyze a variety of driving skills and give an accurate assessment of overall driving competency. Licensing agencies can use the assessment to determine if a driver is prepared to progress to the next level of driver's education (such as on-road driving tests). Further, insurance agencies can use the assessment to determine if a driver is eligible for auto insurance policy discounts.

I. Exemplary System

FIG. 1 generally illustrates one embodiment for a system 100 for a driving simulator on a mobile device. The system 100 may include hardware and software applications, as well as various data communication channels for facilitating data communications between the various hardware and software components. The system 100 may include client device 136 as a front-end component and back-end components 104 in communication with each other via a communication link 106 (e.g., computer network, internet connection, etc.).

FIG. 1 illustrates a block diagram of a high-level architecture of a driving simulator system 100 including various software and/or computer-executable instructions and/or hardware components and/or modules that may employ the software and/or instructions to implement a driving simulator. The various modules may be implemented as computer-readable storage memories containing computer-readable instructions (i.e., software) for execution by a processor of the computer system 100. The modules may perform the various tasks associated with a driving simulator, as herein described. The computer system 100 may also include both hardware and software applications, as well as various data communications channels for communicating data between the various hardware and software components.

The client device 136 may be, by way of example, any one of a smart phone, tablet and/or any client or mobile device appropriately configured may interact with the driving simulator system 100. The client device 136 may be equipped with, among other features, a front-facing camera, an accelerometer, and/or a touch screen display. While only one client device 136 is illustrated in FIG. 1 to simplify and clarify the description, it will be understood that any number of client devices are supported and may be in communication with the backend components 104. The client device 136 may be able to communicate with other client devices (not shown) and/or the backend components 104. Further, while only one CPU 103, Memory 105, and GUI 114 is illustrated in the client device 136, the client device 136 may support any number of these components.

The client device 136 may be implemented for inputting various data necessary for the driving simulator. For example, a driver may be able to provide a log-in to associate driving competency assessments to a profile. The client device 136 may also be implemented to receive parameter inputs to determine the simulation to be rendered by the driving simulator.

The client device 136 may also be used to receive the driver's input during a simulation. The client device 136 may be equipped with an accelerometer to detect when the display is tilted in a certain direction, wherein the tilt may correspond to a turning motion in the simulation. Similarly, the client device may display controls that can be implemented by the driver to indicate various actions such as turning, accelerating, using a turn signal, etc.

The client device 136 may be used to display the simulation. Further, the client device 136 may also include a camera as a means to record driver movement data to be used in driving performance assessment, particularly by recording a driver's head movements.

The client device 136 does not necessarily communicate with the network 106 via a wired connection. In some instances, the client device 136 may communicate with the network 106 via wireless signals 150 and, in some instances, may communicate with the network 106 via an intervening wireless and/or wired device 148, which may be a wireless router, a wireless repeater, a base transceiver station of a mobile telephone provider, etc.

The client device 136 may interact with the data system 116 to receive simulation data and/or server data from the server 120 and may display the simulation data and/or server data via a client application and/or an internet browser (described below). For example, the client device 136 may display a simulator menu and/or a performance assessment on a client application and/or through a web page to a user, may receive an input from the user, and may interact with the data system 116. It will be appreciated that although only one server 120 is depicted in FIG. 1, multiple servers 120 may be provided for the purpose of distributing server load, serving different web pages, etc. These multiple servers 120 may include a web server, an entity-specific server (e.g. an Apple® server, etc.), a server that is disposed in a retail and/or proprietary network, etc.

The simulator module 112 may retrieve data from the various databases 118a and/or 118b. The databases 118a and/or 118b may be maintained by, for example, an insurance provider. Generally, the driver data 118a and/or other data 118b may store information relating to a driver profile, such as identification information (name, address, social security number, etc.), past and/or present insurance policies, incident reports, etc. The module 112 may also be implemented to receive data through client device 136 to be stored in driver data 118a and/or other data 118b.

The client device 136 may contain a GUI 110, which may communicate with the system 116 through the network 106 or other type of suitable network (local area network (LAN), a metropolitan area network (MAN), a wide area network (WAN), a mobile, a wired and/or wireless network, a private network, a virtual private network, etc.). A system server 120 may send and receive information and/or data 118a and/or 118b for the system 100 such as computer-executable instructions and data associated with applications executing on the client device 136 (e.g., the simulator module 112). The applications executing within the system 100 may include cloud-based applications, web-based interfaces to the data system 116, software applications executing on the client device 136, or applications including instructions that are executed and/or stored within any component of the system 100. The applications, GUI 110, browser 114, and module 112 may be stored in various locations including separate repositories and physical locations.

The digital network 106 may be a proprietary network, a secure public Internet, a virtual private network and/or some other type of network, such as dedicated access lines, plain ordinary telephone lines, satellite links, combinations of these, etc. Where the digital network 106 comprises the Internet, data communication may take place over the digital network 106 via an Internet communication protocol.

A system server 120 may send and/or receive information and/or data 118a and/or 118b for the system 100, such as computer-executable instructions and/or data associated with applications executing on the client device 136 (e.g., the simulator module 112). The applications executing within the system 100 may include cloud-based applications, web-based interfaces to the data system 116, software applications executing on the clients, and/or applications including instructions that are executed and/or stored within any component of the system 100. The applications, GUI 110, browser, and module 112 may be stored in various locations including separate repositories and/or physical locations.

In some embodiments, the data system 116 in general and/or the server 120 in particular may include computer-executable instructions 122 stored within a memory 124 of the server 120 and/or executed using a processor 126. The instructions 122 may instantiate a simulator module 112 and/or send instructions to the client device 136 to instantiate a GUI 110 for the tool 112 using a web browser application 114 of a client. In some embodiments, the browser application 114, GUI 110, simulator module 112, and/or elements of the data system 116 may be implemented at least partially on the server 120 and/or client device 136. The data system 116 and/or processor 126 may execute instructions 122 to display the GUI 110 including the data 118a and/or 118b within a display of the client device 136 and/or server 120 (not shown). For simplicity, only one GUI 110 is provided in the exemplary system 100, although this is not intended to limit the number and/or location of the GUI 110.

In one aspect, the module 112 may be a client application that may be implemented as a series of machine-readable instructions for performing the various tasks associated with implementing the driving simulator system 100, as well as receiving information, displaying information, and/or transmitting information between client device 136 and/or server 120.

In various aspects, the module 112 may be implemented as a stand-alone system and/or as a system wherein the front-end component (the client device 136) communicates with back-end components 104 as described herein. Additionally, the module 112 may include machine-readable instruction for implementing a driving simulation from the driving simulator system 100 in accordance with the functionality supported by the module 112.

The module 112 may be a native web browser, such as Apple's Safari®, Google Android™ mobile web browser, Microsoft Internet Explorer® for Mobile, Opera Mobile™, that may be implemented as a series of machine-readable instructions for receiving, interpreting, and/or displaying web page information from the server 120 and/or other back-end components 104 while also receiving inputs from the user. The module 112 may include an embedded web browser that may be implemented as a series of machine-readable instructions for receiving, interpreting, and/or displaying web page information from the servers 120 and/or other back-end components 104 within client device 136.

In one aspect, the module 112 may be an application that is installed on client device 136. For example, the interactive display module 112 may be downloaded and/or installed to client device 136 by a user. Additionally or alternatively, the module 112 may include instructions for implementing a user interface to allow a user to input commands and/or respond to prompts. For example, the module 112 may allow a user to select clickable icons (such as through a touch screen interface) and/or enter information through text inputs. The module 112 may further execute a particular simulation (based on the received inputs) via the client device 136.

II. Exemplary Methods

Simulation Creation And Assessment

Figure 2:
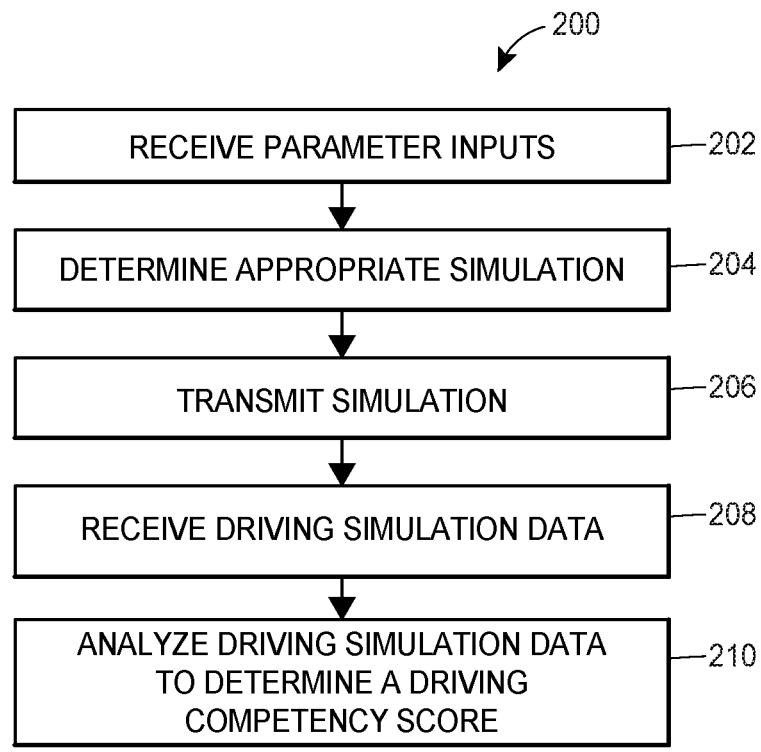
FIG. 2 is a flowchart illustrating an exemplary method for a simulation and assessment cycle of the driving simulator on a mobile device.

FIG. 2 is a flow diagram of an example method 200 for a simulation and assessment cycle of the driving simulator on a mobile device. The example method 200 may be implemented by the server 120, for example.

The method 200 may begin after the system 100 receives parameter inputs corresponding to a simulation (Block 202). For example, simulator module 112 may implement the client device 136 of system 100 to receive parameter inputs. The simulator module 112 may receive indications related to a vehicle to be used in the simulation. The vehicles can include cars, trucks, buses, motorcycles, various makes and models, etc.

The received parameter inputs can also correspond to a type of road and/or driving conditions. The received parameters relating to roads can correspond to real-world cities to be used in the simulation and/or generic roads with particular obstacles for training purposes. The received parameters relating to driving conditions can include various weather conditions for the simulation, lighting conditions (daytime and/or nighttime), etc.

The received parameter inputs can also correspond to a unique driver identification (ID). The parameter inputs corresponding to a driver ID can correspond to a driver profile, which may be stored in driver database 118a, for example. The driving competency score assessed from the simulation can be stored in the driver's profile and used to make determinations corresponding to the driver, discussed in greater detail below.

The received parameter inputs listed above are for illustrative purposes only and not meant to be limiting. Any parameters related to a driving simulation can be received by the simulator module 112 and then used for determining simulations (Block 204)

The simulator module 112 may analyze the received parameter inputs and determine an appropriate simulation. The determined simulation may correspond to the received inputs and/or other factors. For example, the simulator module 112 may determine any aspects of the simulation that were not received in the parameter inputs, such as length of simulation. Further, known techniques can be leveraged for determining a simulation. For example, State Farm's Engaged Driver Training System, State Farm Road Trips and State Farm Road Aware can be implemented in determining an appropriate simulation.

In an embodiment, certain sensors may be implemented in a driver's vehicle. These sensors may assess the driver's real world driving abilities and determine areas that need improvement. For example, it may be determined that a driver needs to practice merging onto a freeway. The determination may be transmitted and stored in the driver's profile in the database 118a. The simulator module 112 may then determine that a simulation to practice merging skills is appropriate for the driver in the consequent simulation.

Once a simulation has been determined, simulator module 112 may transmit the determined simulation (Block 206). The simulator module 112 may transmit the determined simulation to client device 136 of system 100, for example. The client device 136 may then render the simulation and record driving simulation data, discussed in greater detail below with respect to FIG. 3.

The simulator module 112 may then receive driving simulation data (Block 208). The received driving simulation data can be recorded via client device 136, as discussed in greater detail below.

The simulator module 112 may then analyze the received driving simulation data and determine a driving competency score (Block 210). The simulator module 112 may analyze various aspects of the received driving simulation data and assess the proficiency of the driver that completed the previously transmitted simulation. The simulator module 112 may compare received driving simulation data against data in databases 118a and/or 118b to determine a driving competency score.

Further, the simulator module 112 may implement various algorithms to analyze the received driving simulation data to determine a driving competency score. For example, the simulator module 112 may receive a video recording of a driver executing a simulation. The module 112 may then analyze various body movements of the driver (such as head movements and arm movements) throughout the simulation to determine if the driver reacts appropriately to the simulation. The module 112 may then assess a driving competency score based on the analysis.

Further, the simulator module 112 may also analyze simulation data via an accelerometer of the mobile device. The accelerometer may measure hand movements of the driver throughout the simulation. The driver's hand movements may correspond to various controls throughout the simulation, such as accelerating, decelerating, turning, etc. The module 112 can determine if a driver applied appropriate turning speed, acceleration, deceleration, etc. throughout the simulation based on the data received from the accelerometer.

The simulator module may also analyze data recorded by the touch screen display of the client device. For example, the touch screen display may track input from the driver throughout the simulation. The module 112 can determine if a driver reacted appropriately throughout the simulation based on the data received from touch screen display. For example, the module 112 may determine that the driver did not shift gears, accelerate, brake, activate a turn signal, etc. at the appropriate time during the simulation.

Finally, in another embodiment, should the driver receive an unsatisfactory or failing score, he may then be presented with a corresponding tutorial video similar to those presented in Road Aware. The purpose of the tutorial video is to educate the driver on what the correct course of action or mitigation measure would be in that scenario.

Various skills can be tested and assessed by the driving simulator. For example, the driving competency score may be broken up into different sections. In one embodiment, the driving competency score grades the driver's awareness by assessing recorded eye movements. In another embodiment, the driving competency score may judge the driver's ability to anticipate hazards. For example, the use of turn signals, deceleration upon approach of a stoplight, changing lanes to avoid a collision, etc. are all examples of factors that can be used to assess hazard anticipation. In another embodiment, the driver's reactions can be assessed. For example, a driver's reaction (e.g., slow down or swerve) upon encountering an unexpected hazard can be assessed to determine if the safest measures were implemented.

The driving competency score can be recorded in various measures. In one embodiment the driving competency score can be a pass or fail grade. In another embodiment the driving competency score can be a numbered grade, such as a score from 0-100. In another embodiment the driving competency score can be a letter grade such as the system used in traditional academic grading in the United States. In still another embodiment the driving competency score may be a percentage based on the number of skills the driver performed correctly throughout the simulation.

The driving competency score can be used by various institutions. In one embodiment, the determined driving competency score may be used by a licensing agency to determine if a driver is qualified to progress to the next level of driver's education. In another embodiment, an insurance agency may implement the determined driving competency score to determine if the driver is eligible for auto insurance discounts.

Rendering a Simulation and Recording Driving Simulation Data

Figure 3:
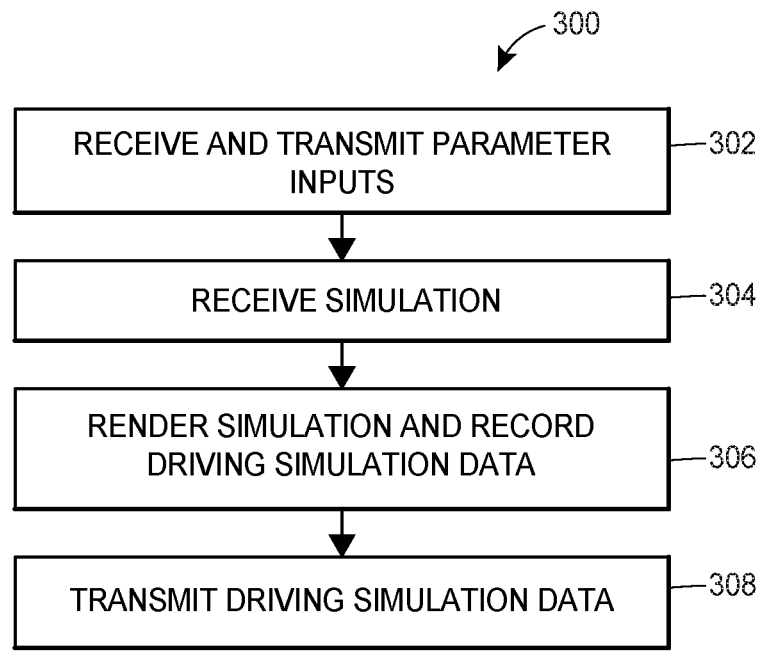
FIG. 3 is a flowchart illustrating an exemplary method for rendering a simulation of the driving simulator on a mobile device.

FIG. 3 is a flow diagram of an example method 300 for rendering a simulation and recording driving simulation data. The example method 300 may be implemented by the client device 136, for example.

The method 300 may begin after the system 100 receives parameter inputs corresponding to a simulation (Block 302). For example, simulator module 112 may implement the client device 136 of system 100 to receive parameter inputs. Example parameter inputs are discussed in greater detail above. The client device 136 may then transmit the received parameter inputs to the backend devices 104

The client device 136 may then receive a simulation from the backend components 104 (Block 304). The client device 136 may then render the received simulation (Block 306). While rendering the simulation, the client device 136 may simultaneously record driving simulation data via any combination of a camera, an accelerometer and/or a touch screen display.

For example, the client device 136 may implement the touch screen display to render the simulation to a driver. The client device 136 may implement the camera to record the driver's head and/or body movements during the simulation. In an example embodiment, the client device 136 may only implement the camera to record the driver's torso, arms and head. The driver's movements throughout the simulation are thus recorded and can be transmitted as part of the driving simulation data. The driver's body movements can be used as part of the determination the driving competency score. If the driver's body movements are too quick or do not correspond correctly to elements of the simulation, the driver may receive a lower driving competency score.

Further, the client device 136 may implement the accelerometer to record the driver's hand movements which may be related to acceleration, turning speed, deceleration, etc. throughout the simulation. The accelerometer may then record how a driver turns the steering wheel, accelerates, brakes, etc. The driving simulation data provided by the accelerometer may also be used as part of the determination of the driving competency score. If a driver does not appropriately implement the functions defined by the accelerometer throughout the execution of the simulation, the driver may receive a low driving competency score.

Although the exemplary system 100 comprises client device 136, the system may include other client devices to render the simulation and capture driving simulation data. For example the client may also implement a keyboard, monitor, mouse, voice recorder, etc. to render the simulation and/or record driving simulation data.

Once the simulation is complete, the computer 138 may transmit the recorded driving simulation data to the back end components 104 (Block 308). The recorded driving simulation data can be used to analyze driving proficiency to determine a driving competency score, as discussed in greater detail above.

The computer may then receive a driving competency score (Block 310). The driving competency score can be received and displayed on the client device 136. Further, the received driving competency score can be emailed, printed, faxed etc. as appropriate.

III. Example Display

Figure 4:
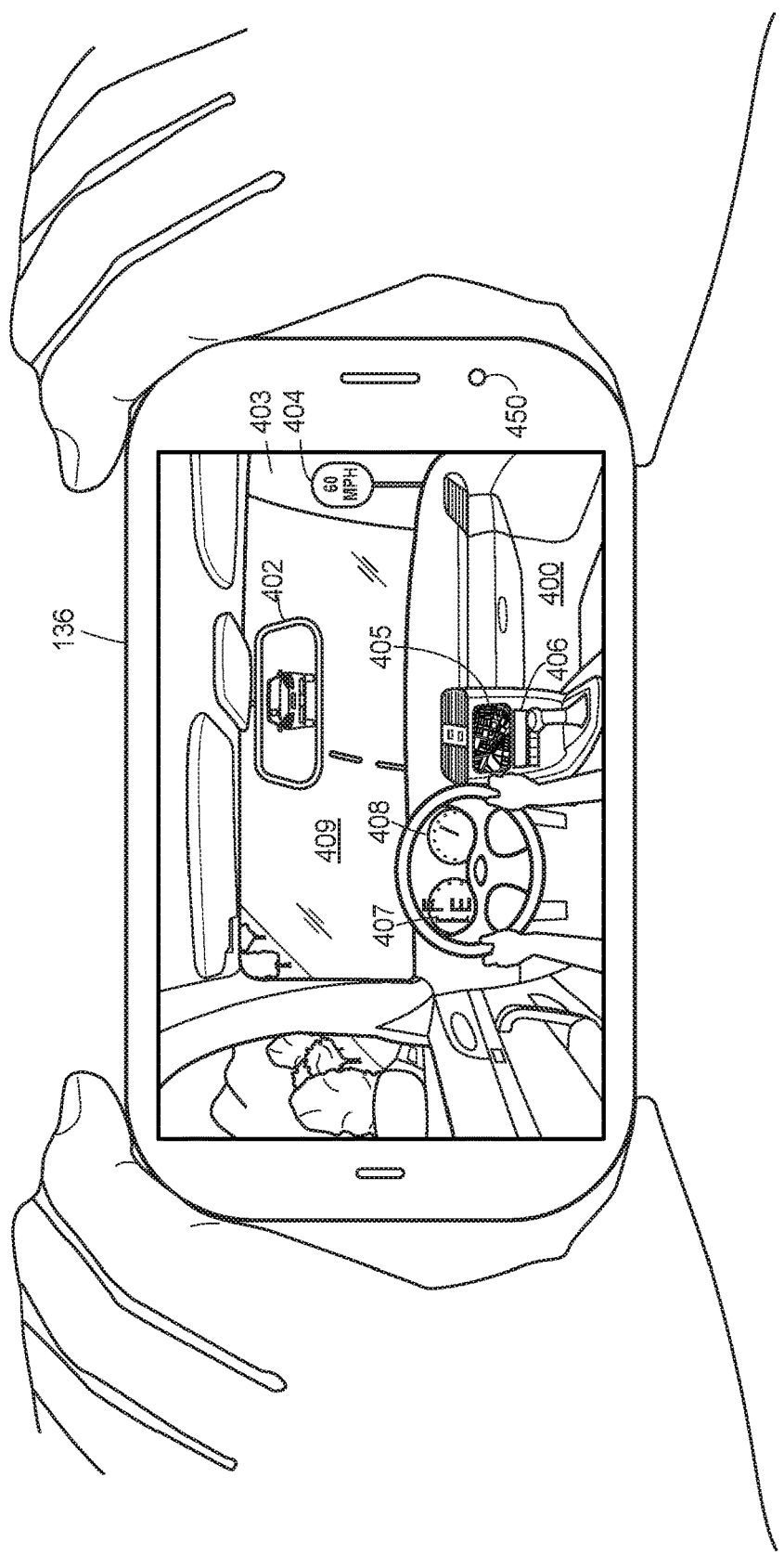
FIG. 4 is an illustration of an simulation rendered by the driving simulator on a mobile device.

FIG. 4 is an example display 400 of the driving simulator. In one embodiment, the example display 400 may be rendered on the client device 136 being held by a driver throughout the simulation. In another embodiment the display can be rendered on a monitor communicatively coupled to the client device 136.

The example display 400 includes various parameters associated with a simulation. For example, the vehicle 401 may be any vehicle corresponding to a driving simulation. The vehicle 401 can include a left-hand-drive car, a right-hand-drive car, a truck, a motor cycle, a bus, etc. The vehicle 401 may also correspond to a particular vehicle (make, model, year) corresponding to a driver.

The variability of the vehicle 401 provides added realism to the simulation. For example, if the selected vehicle is a sports car, the simulation will have the look and feel of a sports car. Similarly, if the selected vehicle 401 is a truck, motorcycle, van, bus etc. the simulation will be adjusted accordingly. The simulator module 112 may achieve this by providing displays and controls based on the selected vehicle 401.

For example, the simulator module 112 may display each particular vehicle 401 differently according to the design layout of the particular vehicle 401. The simulation may display the steering wheel, radio, mirrors, speedometer, fuel meter, etc. according to the design of the selected vehicle 401. The above exemplary display elements are intended as an example and are not intended to limit the scope of the elements that can be displayed according to the vehicle's specifications.

Further, the module 112 may adjust various control elements of the simulation according to the selected vehicle 401. For example, the simulator module 112 may adjust the vehicle acceleration, turning radius, braking speed, visibility, height, etc. of the simulation based on the vehicle 401. In turn, this provides added realism by adjusting the control of the vehicle according to the real world control and/or handling of the vehicle. The above exemplary control elements are intended as an example and are not intended to limit the scope of the control elements that can be adjusted according to the vehicle's specifications.

Still further, the module 112 may adjust the simulation based on the selected vehicle 401. For example, the vehicle

401 may be an Australian automobile which is a right-hand-drive car. The module 112 may then adjust the simulation accordingly, allowing the driver to drive on the left side of the road.

Additional vehicles 402 can be included in the simulation. In one embodiment, the additional vehicles 402 can be computer generated as obstacles to use in performance assessment. In another embodiment, the additional vehicles 402 may correspond to one or more drivers executing the same simulation in the computer network. For example, one or more groups of client devices may execute the simulation concurrently. In turn, each vehicle rendered in the simulation may represent one group of client devices executing the simulation. Multiple drivers may implement one or more groups of client devices to execute the simulation as part of driving education class activity and/or as a group of individuals performing the simulation in a "multi-player" mode.

The simulation may also include interactive rearview mirrors 403. The rearview mirrors 403 may be adjusted by the driver during the simulation. Although only one rearview mirror 403 is included in display 400, a simulation may include multiple rearview mirrors 403 (and/or side view mirrors). Additional, the simulation may include a rearview camera as part of the display 400.

The simulation may also include markers 404. The markers may correspond to different traffic signs, including but not limited to, speed signs, stop signs, caution signs, one-way signs, dead end signs, parking signs, caution signs, traffic lights, etc. A simulation may include one or more markers 404 depending on the received parameters and/or other parameters.

The markers may be used as a part of the analysis for determining the driving competency score. For example, a driver executing the simulation may receive a lower driving competency score if they drive faster than a speed limit indicated by a marker 404.

The simulation may also include a map 405. The map 405 can correspond to the roads 409 of the simulation. The simulation may also include an interactive radio 406, a fuel indicator 407, and/or a speedometer 408.

The roads 409 of the simulation can correspond to real-world roads and/or may be roads created specifically for a simulation. In one embodiment, the roads 409 can be imported from a source (such as Google® maps) as part of the received parameters. The simulation would then provide the driver with a realistic experience of driving in the received destination. In another embodiment, the road 409 may contain various obstacles and/or features included in the received parameters and/or other parameters.

The manner in which the driver reacts to the parameters above can be recorded as part of the driving simulation data. For example, the client device 136 may include front facing camera 450 that can be used to record any one of the driver's eye, shoulder, head and/or body movements. Because the simulation is intended for training purposes, the simulation can include any amount of obstacles to challenge a driver. Various simulations can be implemented to exercise various driving skills. The driving competency score is based on the obstacles and/or parameters provided in the simulation and the manner in which the driver responds to the obstacles and/or parameters. The manner in which driving simulation data is recorded is discussed in greater detail above.

Although the display 400 is a stationary screenshot, in one embodiment, the simulation is an immersive experience. The client device 136 provides an interactive display for rendering the simulation. For example, if the driver viewing display 400 were to move the client device 136 to the left, the display would change to show the elements to the left of the display 400. In this example, the driver in display 400 would turn the client device 136 to the left and see outside the driver-side window (including an interactive side view mirror).

In this embodiment, the client device 136 provides an immersive 360° display by responding to the movements of the driver holding the client device 136. The client continues to provide the display throughout the simulation and may accurately sync the display with the driver's movements. The fully immersive experience provided by the client device 136 is important for providing a realistic simulation and real-world driver training. The immersive experience provided by the client device 136 can make lessons more powerful by successfully simulating high speeds, dangerous conditions, and even collisions, all without putting the driver in real danger.

Further, the client device 136 dramatically improves on the limited screen real estate available on current driving simulator technology by leveraging the 360° simulated visual display provided by client device 136.

IV. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network 106, may include, but is not limited to, any combination of a LAN, a MAN, a WAN, a mobile, a wired or wireless network, a private network, or a virtual private network. Moreover, it is understood that any number of client computers or display devices are supported and may be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for providing a driving simulator on a mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for providing a driving simulation to assess driving competency, the method comprising:
   receiving, via a computer network, one or more parameter inputs corresponding to features to be rendered during a driving simulation, the one or more parameter inputs comprising a driver identification and one or more of a vehicle, a location, a lighting condition, or a weather condition to be rendered during the driving simulation;
   receiving, via the computer network from sensors implemented in a driver's vehicle, an assessment of a driving ability;
   determining, based on the assessment of the driving ability, an area of driving ability that needs improvement;
   storing the area of driving ability that needs improvement in a driver's profile in a database, the driver's profile corresponding to the driver identification;
   configuring, by one or more processors, the driving simulation based on the one or more parameter inputs and the area of driving ability that needs improvement, wherein one or more user controls of a simulated vehicle of the driving simulation are based on the one or more parameter inputs;
   transmitting, via the computer network, the driving simulation for execution on a client device;
   receiving, via the computer network, a video recorded during the driving simulation, wherein the video is recorded via a camera on the client device, and wherein the video captures a user throughout the driving simulation;
   analyzing, by the one or more processors, the video to determine driving simulation data, wherein the driving simulation data comprises one or more of head movements, eye movements, arm movements, body movements, reaction to elements of the driving simulation, or controls operated by the user during the driving simulation;
   analyzing, by the one or more processors, the driving simulation data to determine a driving competency score, wherein the driving competency score is a measure of a driving performance of the user during execution of the driving simulation; and
   presenting, via the client device, a driving tutorial if the driving competency score is below a threshold value.

2. The computer-implemented method of claim 1, wherein the client device is one or more of a smartphone or a tablet.

3. The computer-implemented method of claim 1, wherein the vehicle can be any one of a right-hand-drive car, a left-hand-drive car, a motorcycle, a truck, a van or a bus.

4. The computer-implemented method of claim 1, wherein the computer-implemented method for providing the driving simulation is provided by a driver's licensing agency and wherein the driving competency score is used to determine if the user is allowed to qualify for an on-road driving test.

5. The computer-implemented method of claim 1, wherein determining the driving competency score comprises determining one of a letter grade, a percentage score, a passing grade, a failing grade, or a numeric score.

6. A system comprising:
   one or more processors;
   a database;
   sensors configured in a driver's vehicle;
   a client device including a camera, an accelerometer, and a touchscreen display; and
   a non-transitory computer-readable medium storing thereon instructions that, when executed by the one or more processors, cause the system to:
     receive one or more parameter inputs corresponding to features to be rendered during a driving simulation, the one or more parameter inputs comprising a driver identification and one or more of a vehicle, a location, a lighting condition, or a weather condition to be rendered during the driving simulation;
     receive, from the sensors implemented in the driver's vehicle, an assessment of a driving ability;
     determine, based on the assessment of the driving ability, an area of driving ability that needs improvement;
     store the area of driving ability that needs improvement in a driver's profile in the database, the driver's profile corresponding to the driver identification;
     configure the driving simulation based on the one or more parameter inputs and the area of driving ability that needs improvement, wherein one or more user controls of a simulated vehicle of the driving simulation are based on the one or more parameter inputs;

execute, via the client device, the driving simulation;

record, via the client device, a video that captures the user throughout the driving simulation;

analyze the video to determine driving simulation data corresponding to the user during the driving simulation, wherein the driving simulation data comprises one or more of head movements, eye movements, arm movements, body movements, reaction to elements of the driving simulation, or controls operated during the driving simulation;

analyze the driving simulation data to determine a driving competency score, wherein the driving competency score is a measure of a driving performance of the user during execution of the driving simulation; and present, via the client device, a driving tutorial if the driving competency score is below a threshold value.

7. The system of claim 6, wherein the client device is one or more of a smartphone or a tablet.

8. The computer-implemented method of claim 1, wherein configuring the driving simulation further comprises:

providing displays and controls corresponding to the vehicle of the one or more parameter inputs.

9. The computer-implemented method of claim 1, wherein configuring the driving simulation further comprises:

illustrating the driving simulation to correspond to a real-world location based on the location of the one or more parameter inputs.

10. The computer-implemented method of claim 9, wherein configuring the driving simulation further comprises:

importing map data from a remote source; and illustrating the driving simulation based on the map data.

11. The computer-implemented method of claim 1, wherein the sensors are specially configured to collect data corresponding to a use of the driver's vehicle.

12. The system of claim 6, wherein the sensors are specially configured to collect data corresponding to a use of the driver's vehicle.

13. The computer-implemented method of claim 6, wherein configuring the driving simulation further comprises:

providing displays and controls corresponding to the vehicle of the one or more parameter inputs.

14. The computer-implemented method of claim 6, wherein configuring the driving simulation further comprises:

illustrating the driving simulation to correspond to a real-world location based on the location of the one or more parameter inputs.

15. The computer-implemented method of claim 6, wherein configuring the driving simulation further comprises:

importing map data from a remote source; and illustrating the driving simulation based on the map data.

* * * * *